United States Patent Office 3,804,723
Patented Apr. 16, 1974

3,804,723
PURIFICATION OF BETA-NAPHTHOL BY
STEAM DISTILLATION
John Peter Dundon, North Branch, Herbert Rudolph
Kemme, Flemington, and Edward Jonathan Scharf,
Somerville, N.J., assignors to American Cyanamid
Company, Stamford, Conn.
No Drawing. Filed Jan. 29, 1973, Ser. No. 327,350
Int. Cl. B01d 3/38; C07c 37/22
U.S. Cl. 203—92                              5 Claims

ABSTRACT OF THE DISCLOSURE

Non-phenolic impurities, particularly 2-methyl-naphthofuran, contained in beta-naphthol produced by the hydroperoxide-oxidation cleavage process, are substantially completely removed by (1) forming a single phase mixture of the beta-naphthol product and water, at a temperature of at least 190° C., and (2) subjecting the mixture to steam distillation at a temperature above 190° C. and at an autogenous pressure above about 175 p.s.i.g.

---

This invention relates to a method for the separation of impurities from beta-naphthol. More particularly, it relates to a novel method for the removal of non-phenolic impurities, especially 2-methylnaphthofuran (MNF), from beta-naphthol.

Beta-naphthol, as produced commercially, e.g., by the oxidation-cleavage process, contains minor amounts of unreacted starting materials, e.g., isopropylnaphthalene (IPN) and by-products, such as isopropenylnaphthalene (IPEN) and acetonaphthone (ACN), together with small but significant amounts of non-phenolic by-products, primarily 2-methylnaphthofuran. In order to purify the beta-naphthol, the practice to date has been to subject the crude beta-naphthol product to fractional distillation. While this is an entirely satisfactory method for the removal of IPN and IPEN, it is not adequate for the removal of the other impurities, such as the MNF, which have vapor pressures very close to that of the beta-naphthol itself. The successful removal of the MNF has posed a problem in that for many uses the presence of even small amounts of the MNF, i.e., amounts above about 0.03%, by weight, in the beta-naphthol cannot be tolerated. Thus, where the beta-naphthol is used as a coupling agent in the manufacture of azo dyes, the presence of more than 0.03% of the MNF can adversely affect the color and/or shade of the dye product.

It is, therefore, the object of the present invention to provide a more effective means for removing the non-phenolic impurities, particularly the MNF, from beta-naphthol.

In accordance with the invention, the aforesaid object is accomplished by a process comprising (1) forming a single phase mixture of the beta-naphthol and water at a temperature above about 190° C. and (2) subjecting the said mixture to steam distillation at a temperature above 190° C. and at a pressure above about 175 p.s.i.g. Thus, it has been found that by this process, the MNF content of the beta-naphthol is substantially reduced, with reductions down to only 0.001% being obtained under the most favorable conditions of the process.

Applicants' finding that such a highly effective separation of the MNF from the beta-naphthol could be achieved by this process was wholly unexpected since steam distillation of the beta-naphthol at temperatures below 190° C., where the beta-naphthol is not completely miscible with the water (i.e., where the water-beta-naphthol mixture being distilled is not in a single phase) effects no reduction in the MNF content of the beta-naphthol.

It has been found that for the distillation to be effective, the proportion of water to beta-naphthol in the water-beta-naphthol mixture be at least about 4 and up to about 15 parts by weight of water per part of the beta-naphthol and that the best results are obtained when a proportion about 5 to about 10 parts of water per part of the beta-naphthol is used.

Also, for effective results at least about 4 and up to about 15 parts by weight of steam per part of beta-naphthol must be employed in the distillation with a proportion of from about 5 to about 10 parts of steam per part of the beta-naphthol giving the best results.

While higher proportions of water and/or steam to beta-naphthol, i.e., above about 15 to 1, may be employed in the process of the invention, no advantage would be provided thereby and the use of such higher proportions would, therefore be impractical.

Also, while temperatures above about 190° C. and pressures above about 175 p.s.i.g. may be employed in the process of this invention, temperatures of from 200° C. to about 225° C. and autogenous pressures of from about 210 to about 230 p.s.i.g. give excellent results and are preferred from the practical stand-point.

The extent of removal of the MNF by the distillation process of the invention will, of course, be affected by the equipment used. Thus, while ordinary steam distillation using a simple condenser will effect a substantial reduction in the MNF content of the beta-naphthol, much greater reductions, down to only 0.001%, are achieved by the use of a rectifying column, rather than a simple condenser, in the process. Such rectifying columns and the design and use thereof are, of course, well known to those familiar with the distillation art. See, for example, Chemical Engineer's Handbook, 2nd ed. McGraw-Hill Book Company, Inc., 1941, pp. 1444–1446. While, therefore, the process of the invention is illustrated in the examples which follow using a column of the sieve plate type, those skilled in the art will appreciate that other types of columns, such as bubble-cap plate columns or packed columns, may be employed with equivalent results.

EXAMPLES 1–28

A series of separate steam distillations (Examples 1–28) were carried out on a beta-naphthol product which had been fractionally distilled to remove impurities such as isopropyl naphthalene (IPN) and isopropenyl naphthalene (IPEN) but which still contained 0.54% by weight of methyl naphthofuran (MNF). The pertinent data with respect to the distillations are shown in Table I.

A 25-plate, 3-in. (diameter) sieve tray column was employed in the distillation, the data being obtained under steady state operating conditions. The procedure was as follows. The beta-naphthol was mixed with water in the ratio indicated and heated to the specified temperature. The single phase beta-naphthol water mixture thus provided was fed to the distillation column at the plate number indicated. The appropriate amount of steam, generated in a reboiler, was fed into the bottom of the column and the pressure in the column controlled at the level indicated by means of a pressure release valve in the vapor discharge line at the top of the column. The distillate vapors containing the volatilized impurities, including the MNF, are withdrawn through the vapor discharge line and condensed. The purified beta-naphthol water mixture is withdrawn from the bottom of the column, passed through the reboiler (where the water portion thereof is vaporized) and collected.

As the data in Table I indicate, the best results were obtained in the distillation when the ratios of water to beta-naphthol and of steam to beta-naphthol are each above about 5, with ratios of about 4 representing the lowest practicable ratios for the particular distillation column here used. However, with columns of greater design efficiency, it may be possible to use lower ratios of water to beta-naphthol and/or of steam to beta-naphthol and still achieve results equivalent to those obtained herein.

TABLE I

| Ex. No. | Feed plate No.[1] | Water/ BN ratio (lbs./lb.) | Steam/ BN ratio (lbs./lb.) | Pressure (p.s.i.g.) | Vapor temp., °C. | Percent MNF |
|---|---|---|---|---|---|---|
| 1 | 15 | 7.3 | 7.6 | 218 | 200 | 0.003 |
| 2 | 15 | 7.8 | 8.2 | 218 | 200 | 0.004 |
| 3 | 15 | 6.15 | 6.85 | 228 | 198 | 0.072 |
| 4 | 15 | 5.85 | 5.43 | 228 | 198 | 0.180 |
| 5 | 15 | 4.2 | 2.8 | 218 | 200 | 0.443 |
| 6 | 20 | 6.5 | 6.5 | 220 | 199 | 0.028 |
| 7 | 20 | 6.2 | 6.5 | 218 | 199 | 0.017 |
| 8 | 20 | 4.0 | 4.4 | 218 | 200 | 0.290 |
| 9 | 20 | 4.0 | 3.8 | 218 | 200 | 0.336 |
| 10 | 25 | 8.0 | 7.6 | 218 | 200 | 0.001 |
| 11 | 25 | 8.9 | 8.9 | 215 | 200 | 0.001 |
| 12 | 25 | 8.9 | 4.4 | 218 | 198 | 0.301 |
| 13 | 25 | 8.2 | 6.4 | 215 | 197 | 0.201 |
| 14 | 25 | 6.8 | 6.5 | 222 | 198 | 0.018 |
| 15 | 25 | 3.9 | 4.0 | 218 | 200 | 0.298 |
| 16 | 25 | 5.0 | 4.9 | 225 | 196.5 | 0.193 |
| 17 | 25 | 5.0 | 5.66 | 230 | 199.5 | 0.090 |
| 18 | 25 | 5.26 | 5.63 | 230 | 199.5 | 0.060 |
| 19 | 25 | 5.93 | 5.85 | 222 | 199 | 0.026 |
| 20 | 25 | 8.0 | 7.6 | 200 | 200 | 0.028 |
| 21 | 25 | 6.3 | 5.08 | 200 | 200 | 0.044 |
| 22 | 25 | 5.93 | 5.93 | 155 | 180 | 0.588 |

[1] Plates numbered from the bottom to the top of the column.

We claim:

1. A process for treating beta-naphthol to remove non-phenolic impurities therefrom comprising (1) forming a single phase mixture of the beta-naphthol and water at a temperature above about 190° C., said mixture containing, on a weight basis, at least about 4 parts of water per part of the beta-naphthol, and (2) subjecting the said mixture to steam distillation at a temperature above about 190° C. and at a pressure above about 175 p.s.i.g., the amount of steam employed in the distillation being, on a weight basis, at least about 4 parts per part of the beta-naphthol.

2. The process of claim 1 wherein the said mixture contains from about 5 to about 10 parts of water per part of beta-naphthol.

3. The process of claim 1 wherein the amount of steam employed in the distillation is from about 5 to about 10 parts per part of beta-naphthol.

4. The process of claim 1 wherein the distillation temperature is from about 200° C. to about 225° C.

5. The process of claim 1 wherein the distillation pressure is from about 210 p.s.i.g. to about 230 p.s.i.g.

References Cited

UNITED STATES PATENTS 3,304,253   2/1967   Lewis _____ 260—627 B

FOREIGN PATENTS 815,754   7/1959   Great Britain _____ 260—627 B
865,677   4/1961   Great Britain _____ 260—627 B NORMAN YUDKOFF, Primary Examiner F. SEVER, Assistant Examiner U.S. Cl. X.R.

203—95; 260—621 A, 627 R